Feb. 2, 1926.
H. L. MERRICK
WEIGHING MECHANISM
Filed Nov. 15, 1921    2 Sheets-Sheet 1
1,571,288
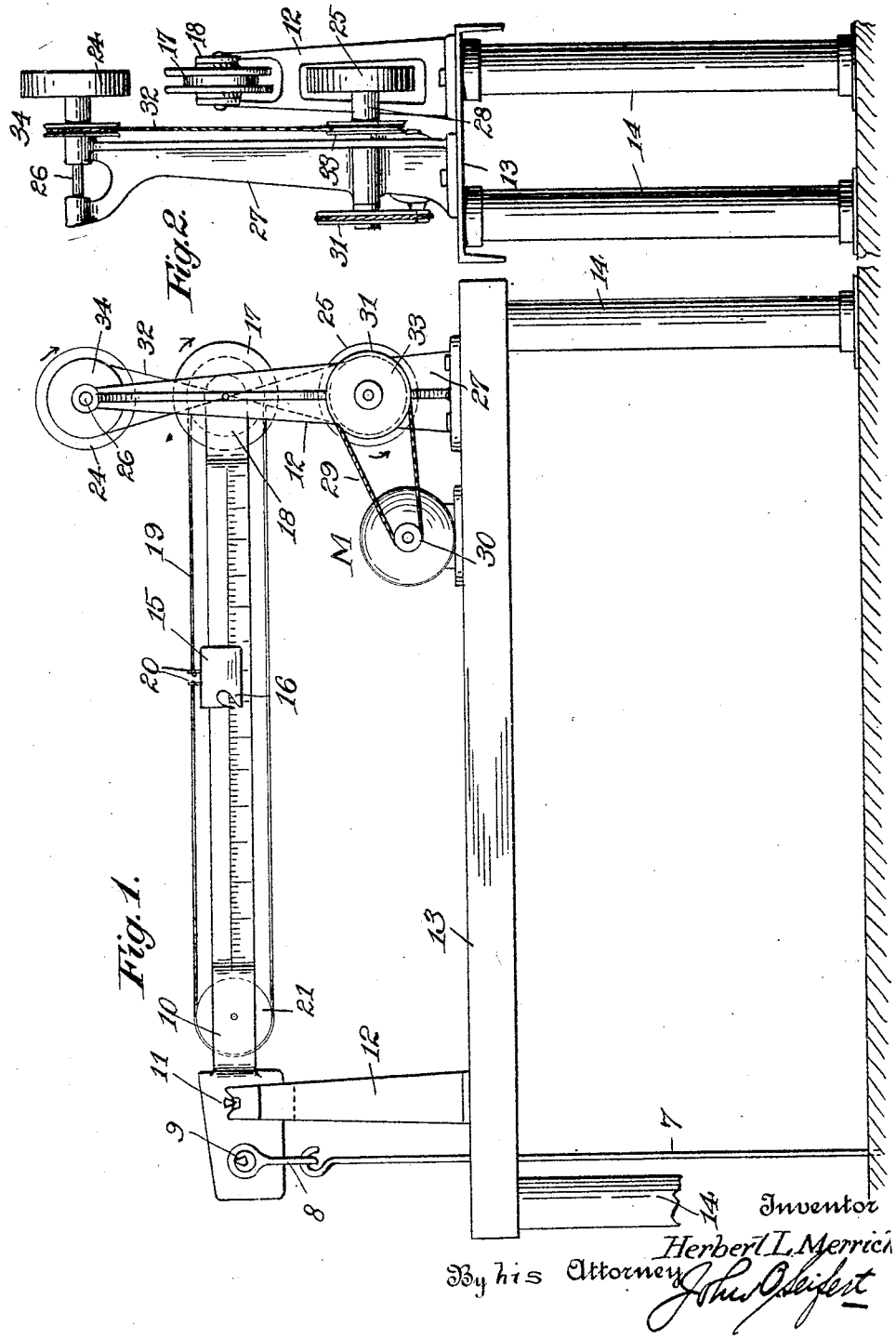
Inventor
Herbert L. Merrick
By his Attorney Feb. 2, 1926.  
H. L. MERRICK  
WEIGHING MECHANISM  
Filed Nov. 15, 1921
1,571,288
2 Sheets-Sheet 2
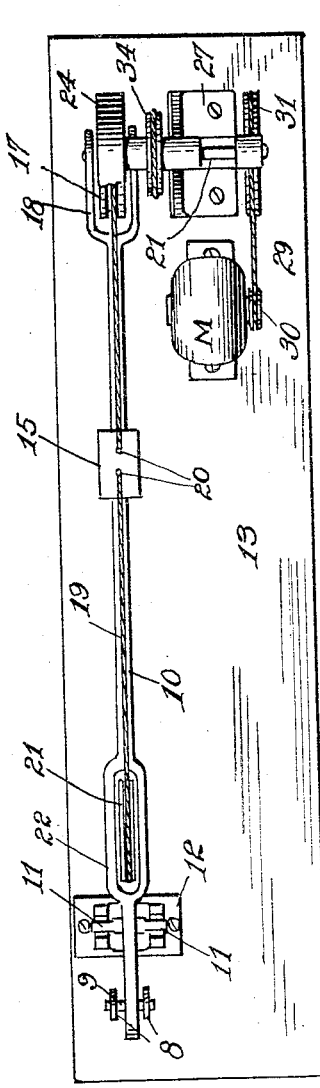
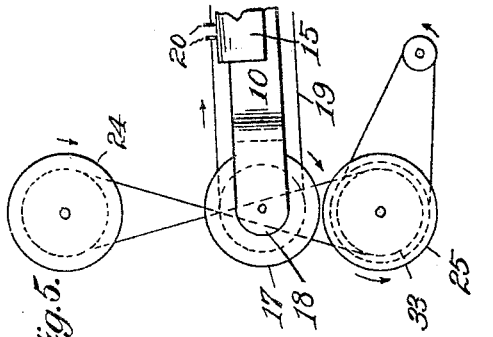
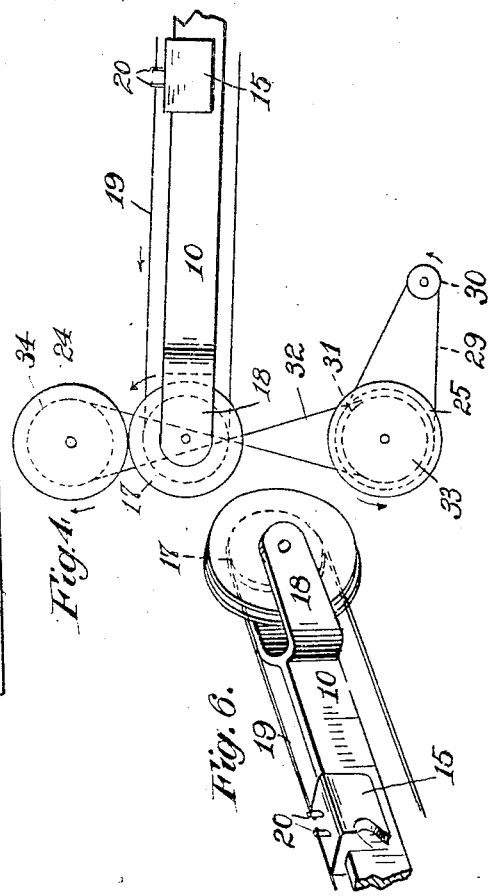
Inventor  
Herbert L. Merrick  
By his Attorney Patented Feb. 2, 1926.

1,571,288

UNITED STATES PATENT OFFICE.

HERBERT L. MERRICK, OF PASSAIC, NEW JERSEY.

WEIGHING MECHANISM.

Application filed November 15, 1921. Serial No. 515,227.

*To all whom it may concern:*

Be it known that I, HERBERT L. MERRICK, a citizen of the United States, and a resident of Passaic, in the county of Passaic and State of New Jersey, have invented certain new and useful Improvements in Weighing Mechanism, of which the following is a specification.

This invention relates to weighing mechanism employing a steelyard or scale beam arranged to be influenced by a load to be weighed and to counterbalance such load by a counterpoise weight adjustable on the beam, and the weight co-operating with graduations on the scale beam to indicate the weight of the load, and it is the object of the invention to provide improved means controlled by the deflection of the scale beam operable to automatically adjust the poise weight upon the beam to bring the beam into equilibrium to counterbalance a load being weighed.

In carrying out the invention I provide a scale beam pivotally supported between its ends and arranged to support a load from one end and having a poise weight adjustably mounted on the other end, said beam carrying a rotatable driven wheel having connection with the poise weight to adjust the latter on the beam through the rotation of said wheel, a pair of oppositely rotating driving wheels being arranged so that one of said wheels will be engaged by the driven wheel as the scale beam is moved to overload or underload position to transmit the rotative movement of a driving wheel to the driven wheel and thereby adjust the poise weight upon the beam.

In the drawings accompanying and forming a part of this specification Figure 1 is a front elevation of weighing mechanism with the embodiment of my invention to automatically adjust the poise weight upon the beam applied thereto, only so much of the mechanism being shown as is essential to an understanding of the invention.

Figure 2 is an end elevation looking at the right of Figure 1.

Figure 3 is a plan view.

Figure 4 is a side elevation of the means to adjust the poise weight upon the beam and showing the position of the parts when the beam is moved to overload position by the imposition of a load upon the weighing mechanism to adjust the poise weight outward upon the beam to counterbalance the load.

Figure 5 is a view similar to Figure 4, but showing the parts in position when the beam is moved to underload position as by the removal of the load from the weighing mechanism to adjust the poise weight in a direction towards the pivotal support of the beam to bring the latter into initial position of equilibrium; and Figure 6 is an enlarged detail view in perspective to show the mounting of a driven wheel upon the scale beam operable to adjust the poise weight upon the beam.

Similar characters of reference designate like parts throughout the different views of the drawings.

An embodiment of my invention is shown in the drawings in connection with a platform scale in which a load receiving platform (not shown) is connected by a rod 7 to a shackle 8 having eyes for the engagement of knife edge pivots 9 projecting laterally from opposite sides at one end of a scale beam or steelyard 10 fulcrumed or pivotally supported intermediate its ends by knife edge pivots 11 projecting from opposite sides of the beam engaging upon bearings in a standard 12 mounted upon a shelf 13 supported upon columns 14. The end of the beam opposite to its connection with the load receiving platform is arranged with graduations and has a poise weight 15 adjustably mounted thereon arranged, as at 16, to co-operate with the graduations on the scale beam to indicate the weight of the load weighed.

To automatically adjust the poise weight along the beam when the beam has been deflected from the horizontal or moved out of equilibrium by the placing of a load upon the load receiver or platform to counterbalance and weigh such load, or again bring the beam into equilibrium when the scale beam has been relieved of the load a driven wheel 17 is rotatably supported in a bifurcation 18 (Figures 3 and 6) at the end of the beam opposite to which the load supporting means or platform is connected. This wheel is adapted to be rotated in opposite directions and has an operative connection with the poise weight whereby as the wheel is rotated the poise weight will be adjusted upon the beam the direction of such adjustment being controlled by the direction of travel of the wheel 17. To effect such movement of the poise weight a belt or cable 19 is connected at one end to the poise weight, as at 20, said belt passing around and engaging in a peripheral groove in the wheel 17 as clearly shown in Figures 3 and 6, and passes around a grooved wheel or sheave 21 rotatably carried by the beam adjacent its pivotal support, as shown at 22, (Figure 3) with the opposite end of the belt connected to the poise weight at 20. It will be obvious that as the wheel 17 is rotated in the direction of the arrow shown in Figure 1 that the belt will exert a pull on the poise weight to move the same outward upon the beam, and that as the wheel is rotated in opposite direction movement will be imparted to the poise weight in reverse direction.

To impart rotative movement to the driven wheel 17 a pair of driving wheels 24, 25 are supported to rotate on axes substantially parallel with the axis of the wheel 17 one above and the other below the wheel 17 and in spaced relation to said latter wheel when the scale beam is in equilibrium. The wheel 24 is fixed to a shaft 26 journalled in a standard 27 fixed upon the shelf 13 and the wheel 25 is fixed to a shaft 28 also journalled in the standard 27. The wheel 17 is arranged so that the pivotal surfaces at opposite sides of the peripheral grooves constitute a friction face, and the peripheral surfaces of the wheels 24, 25 are arranged to constitute frictional driving surfaces with which the wheel 17 is brought into engagement when the scale beam is deflected from the horizontal.

The wheels 24, 25 are continuously driven in opposite directions, as indicated by the arrows in Figures 1, 4 and 5 from a suitable source of power, and shown in the present instance as an electric motor (indicated in a general way by M) mounted upon the shelf 13, by a belt 29 passing around a pulley 30 fixed to the shaft of the motor and a pulley 31 fixed to the shaft 28, the wheel 24 being rotated from the shaft 28 by a crossed belt passing around a pulley 33 fixed to the shaft 28 and a pulley 34 fixed to the shaft of wheel 24.

In operation in the normal position of equilibrium of the scale beam the wheel 17 is inoperative. As a load is applied to the weighing mechanism the end of the scale beam opposite its connection with the load supporting means or platform is moved or deflected upward to overload position thereby bringing the driven wheel 17 into frictional engagement with the periphery of wheel 24 (Figure 4) thereby rotating the wheel 17 in the direction of the arrow indicated in Figures 1 and 4, this movement of the wheel 17 through the belt connection with the poise weight pulling or adjusting the poise weight outward upon the beam and such adjustment of the poise weight will continue so long as the beam is in overload position and until the beam is brought into equilibrium by the counterbalancing of the load through the adjustment of the poise weight. As the load is removed from the weighing mechanism, due to the previous adjustment of the poise weight outward on the beam, the scale beam, or the outer end thereof, will be moved or deflected downward to underload position thereby bringing the wheel 17 into frictional engagement with the periphery of driving wheel 25 (Figure 5) when said wheel 17 will be driven in a direction reverse to that in which it was driven by the wheel 24, as indicated by the arrow in Figure 4, and such movement of the wheel 17 adjusting the poise weight in an opposite direction or inward upon the scale beam, such movement of the poise weight continuing so long as the beam is in underload position and until the beam is again brought into initial position of equilibrium and in position for the weighing of another load. It will be obvious that the poise weight need not be first returned to position to bring the scale beam to initial position of equilibrium before a successive load may be weighed, but that a successive load may be applied to the weighing mechanism as a load previously weighed is removed whether such successive load is of greater or less weight than such previous load.

It will be noted that the poise weight is adjusted upon the beam to counterbalance a load being weighed in a manner similar to that of ordinary hand weighing, but that the poise weight is automatically moved to correct counterbalancing position, and that when the weight of a load is removed from the weighing mechanism that the poise weight is automatically adjusted to bring the scale beam into initial no-load position.

Having thus described my invention I claim:

1. In weighing mechanism, the combination with a weighing beam arranged to support a load therefrom, of a poise weight movable upon the beam; a friction wheel carried by the beam to rotate on an axis extending transversely of the beam; means to operatively connect said wheel with the poise weight to impart movement thereto along the beam through the movement of the wheel; a pair of friction driving wheels rotatably supported to rotate in the same plane as the wheel carried by the beam; means for continuously rotating said driving wheels in opposite direction, said friction wheel being adapted to be brought into contact with one of the driving wheels when the beam is moved to overload position to rotate said friction wheel in one direction to thereby move the poise weight in one direction along the beam, and said frictional wheel being adapted to be brought into frictional engagement with the other driving wheel to move the friction wheel and poise weight in opposite direction when the beam is moved to underload position for the purpose specified.

2. In weighing mechanism, the combination with a scale beam having load supporting means connected thereto, of a poise weight movable along the beam; a friction driven wheel rotatably carried at the outer end of the beam; a pulley rotatably carried at the inner end of the beam; a cable passing around said wheel and pulley connected to the poise weight and operative to move the poise weight along the beam by the rotation of the friction driven wheel; and a pair of friction driving wheels continuously rotated in opposite directions and with one of which wheels the beam wheel is brought into frictional contact when the beam is moved out of equilibrium to rotate the beam and thereby adjust the poise weight along the beam to bring the beam into equilibrium.

3. In weighing mechanism, the combination with a scale beam having load supporting means connected thereto, of a poise weight adjustable upon the beam; a friction driven wheel rotatably carried at the outer end of the beam; a pulley carried at the inner end of the beam; a cable passing around said pulley and wheel connected to the poise weight, and operative to adjust the poise weight upon the beam by the rotation of the friction driven wheel; a pair of friction driving wheels; means to continuously rotate said friction driving wheels in opposite directions; said friction driven wheel being adapted to be brought into operative relation with one of said driving wheels when the beam is moved to underload position to rotate the friction driven wheel and adjust the poise weight in one direction upon the beam and to be brought into operative relation with the other driving wheel when the beam is moved to overload position to rotate the friction driven wheel and adjust the poise weight in an opposite direction upon the beam for the purpose specified.

4. In weighing mechanism, the combination with a scale beam having load receiving means connected thereto, of a poise weight adjustable along the beam; a driven friction wheel carried by the beam; means to operatively connect the poise weight to said driven friction wheel to adjust the poise weight along the beam through the rotation of said friction wheel; a pair of friction wheels; means to continuously turn said friction wheels in opposite directions and with one of which friction wheels the driven friction wheel is adapted to be brought into frictional contact when the beam is moved out of equilibrium to rotate the driven wheel and thereby adjust the poise weight along the beam for the purpose specified.

5. In weighing mechanism, the combination with a scale beam having load receiving means connected thereto, of a poise weight adjustable upon the beam; a driven friction wheel carried by the beam means to operatively connect the poise weight to said driven friction wheel to adjust the poise weight upon the beam through the rotation of said friction wheel; a pair of driving friction wheels; means to continuously rotate said friction wheels in opposite directions; one of said friction wheels being supported above and the other below the driven wheel carried by the beam and in spaced relation thereto when the beam is in equilibrium, and with one of which driving wheels the driven wheel is brought into operative relation when the beam is moved to underload position and brought into operative relation with the other driving wheel when the wheel is moved to overload position to adjust the poise weight along the beam for the purpose specified.

6. In weighing mechanism, the combination with a pivotally supported scale beam having load receiving means connected thereto, of a poise weight adjustable upon the beam; a driven friction wheel rotatably carried at the outer end of the beam, said wheel being provided with a peripheral groove; a grooved wheel rotatably carried by the beam adjacent its pivotal support; a belt passing around the grooved wheel and the peripheral groove of the driven friction wheel connected at opposite ends to the poise weight whereby as the driven friction wheel is rotated said poise weight is adjusted upon the beam; a pair of driving friction wheels supported one above and the other below the friction driven wheel in spaced relation thereto when the beam is in equilibrium; means to rotate said driving friction wheels in opposite directions; said driven friction wheel being adapted to be brought into operative engagement with one of said driving wheels when a load is applied to the scale beam to rotate the driven wheel in a direction to adjust the poise weight upon the beam to counterbalance the load, and to be brought into operative engagement with the other driving wheel when the load is removed from the scale beam to rotate the driven wheel in reverse direction and adjust the poise weight upon the beam to bring the beam to initial position of equilibrium.

Signed at Passaic, in the county of Passaic and State of New Jersey this 10th day of November, 1921.

HERBERT L. MERRICK.